United States Patent

Honbo et al.

[11] Patent Number: 5,180,457
[45] Date of Patent: Jan. 19, 1993

[54] PNEUMATIC RADIAL TIRES FOR CONSTRUCTION VEHICLES

[75] Inventors: Yoichi Honbo; Satoshi Yoshizaki, both of Kodaira; Motohiro Iwasaki, Higashiyamato, all of Japan

[73] Assignee: Bridgestone Corporation, Tokyo, Japan

[21] Appl. No.: 660,819

[22] Filed: Feb. 26, 1991

[30] Foreign Application Priority Data

Mar. 1, 1990 [JP] Japan .................. 2-47298

[51] Int. Cl.⁵ .......................................... B60C 15/06
[52] U.S. Cl. .................... 152/541; 152/543; 152/546
[58] Field of Search ............ 152/539, 541, 542, 543, 152/546

[56] References Cited

U.S. PATENT DOCUMENTS

| | | |
|---|---|---|
| 4,139,040 | 2/1979 | Samoto et al. . |
| 4,185,677 | 1/1980 | Motomura et al. ............... 152/543 |
| 4,366,851 | 1/1983 | Makino et al. . |
| 4,471,828 | 9/1984 | Kishida et al. ................. 152/543 |
| 4,700,764 | 10/1987 | Endo et al. . |
| 4,716,950 | 1/1988 | Morikawa et al. ............... 152/541 |
| 4,735,249 | 4/1988 | Kabe et al. . |
| 4,766,940 | 8/1988 | Yokoyama et al. . |
| 4,773,463 | 9/1988 | Okuni et al. . |
| 4,779,659 | 10/1988 | Hanada et al. . |
| 4,811,773 | 3/1989 | Endo et al. . |
| 4,852,626 | 8/1989 | Tsukagoshi . |

FOREIGN PATENT DOCUMENTS

| | | | |
|---|---|---|---|
| 0091410 | 7/1980 | Japan .................. | 152/542 |
| 0047704 | 3/1985 | Japan .................. | 152/539 |
| 0047706 | 3/1985 | Japan .................. | 152/539 |
| 0287804 | 12/1986 | Japan .................. | 152/542 |

Primary Examiner—Michael W. Ball
Assistant Examiner—Nancy T. Krawczyk
Attorney, Agent, or Firm—Sughrue, Mion, Zinn, Macpeak & Seas

[57] ABSTRACT

A pneumatic radial tire for construction vehicles comprises a radial carcass of rubberized steel cord ply, a stiffener rubber disposed on a bead core, and at least two reinforcing layers of rubberized fiber cord fabrics having different cord directions as a bead portion reinforcement. This reinforcing layer satisfies the particular height relations to the carcass ply and its turnup portion.

7 Claims, 7 Drawing Sheets

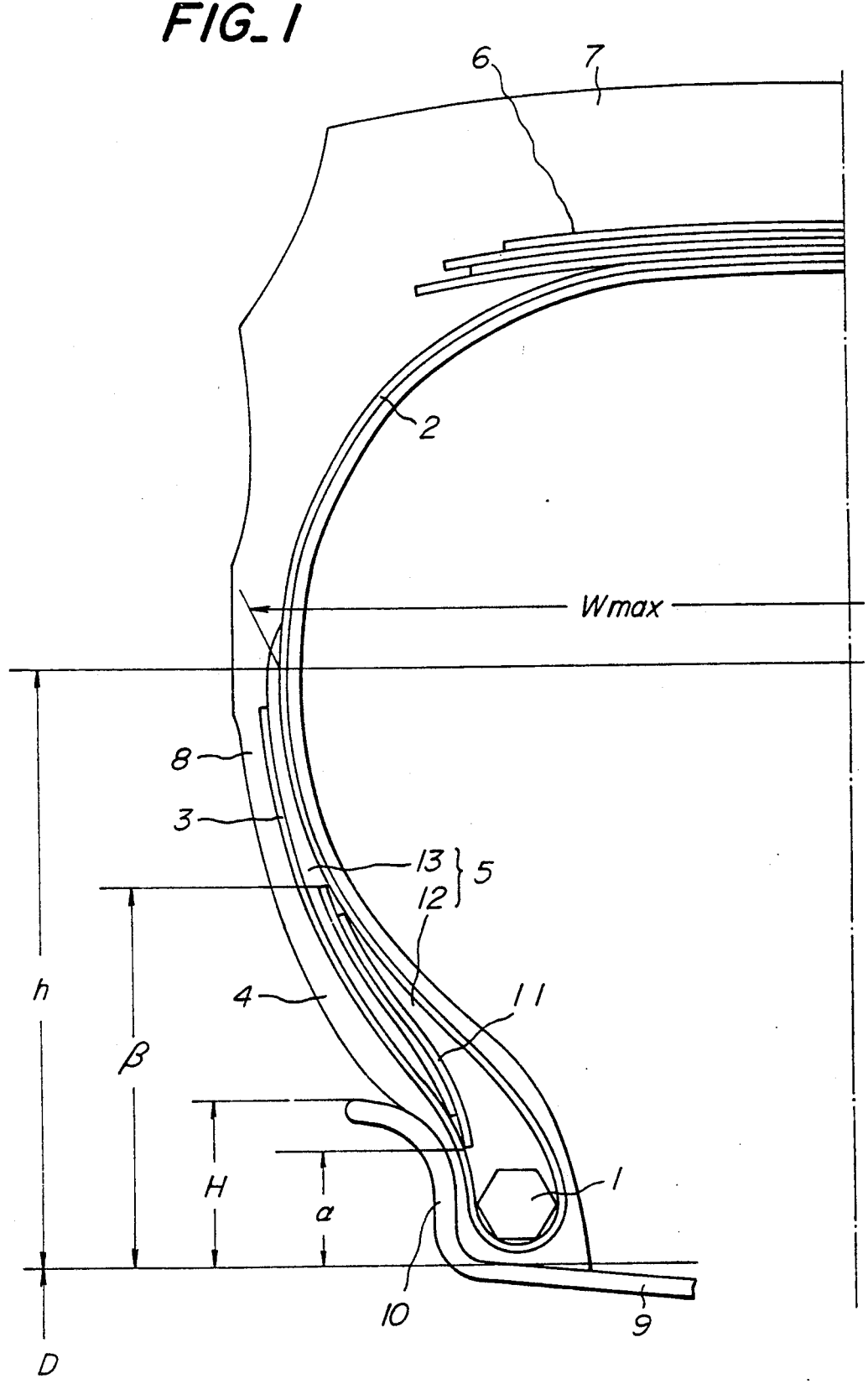
FIG_1

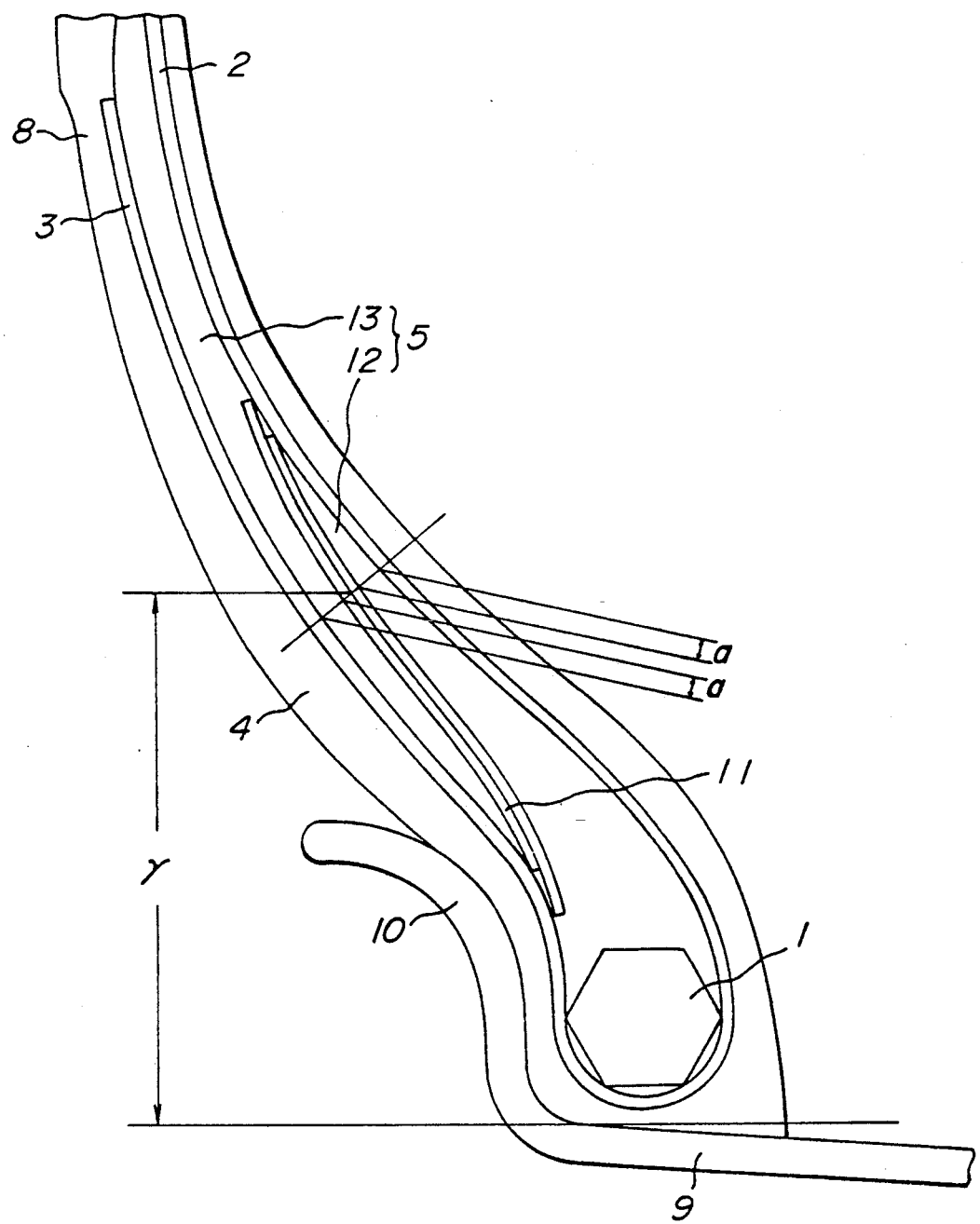
FIG_2

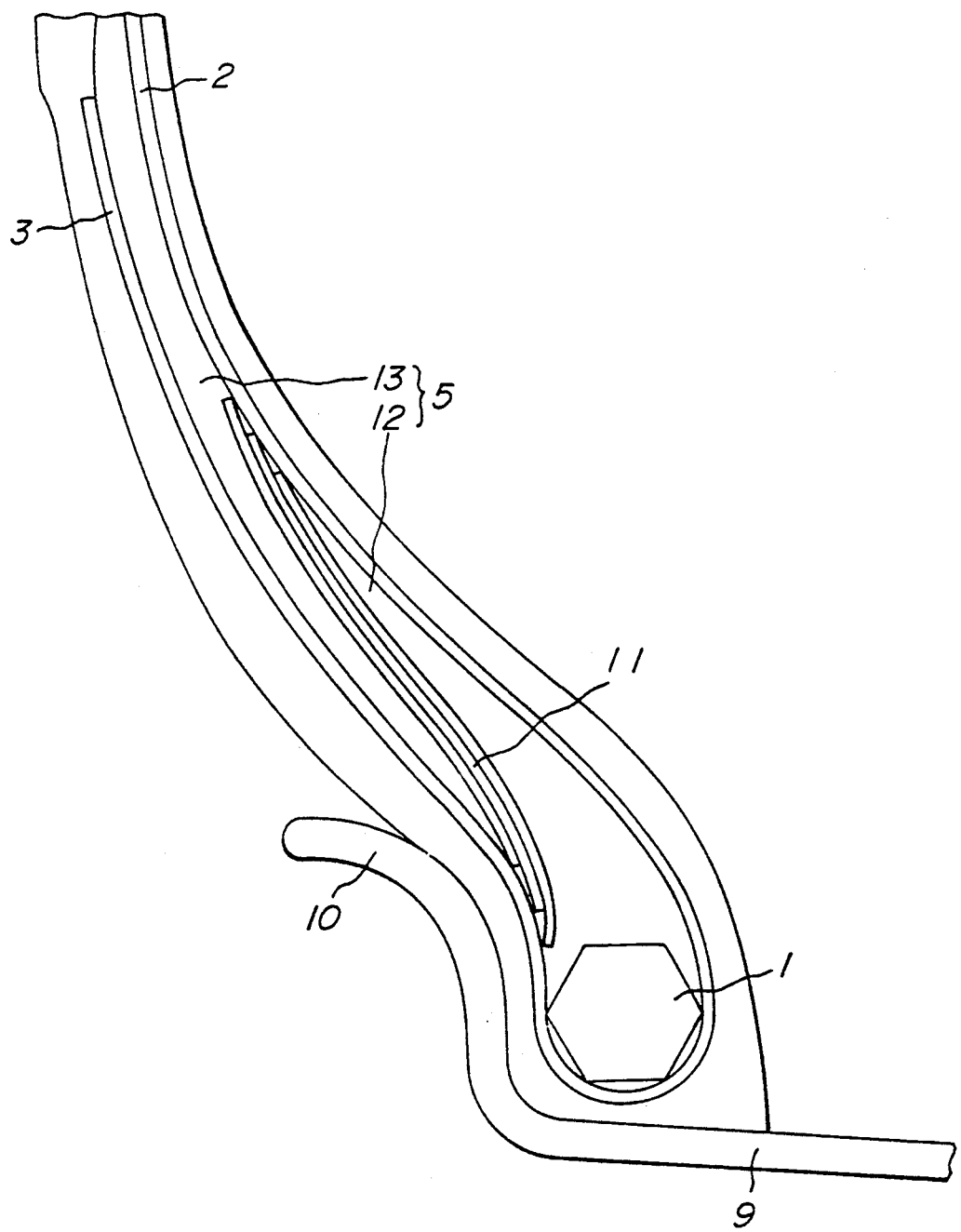
FIG_3

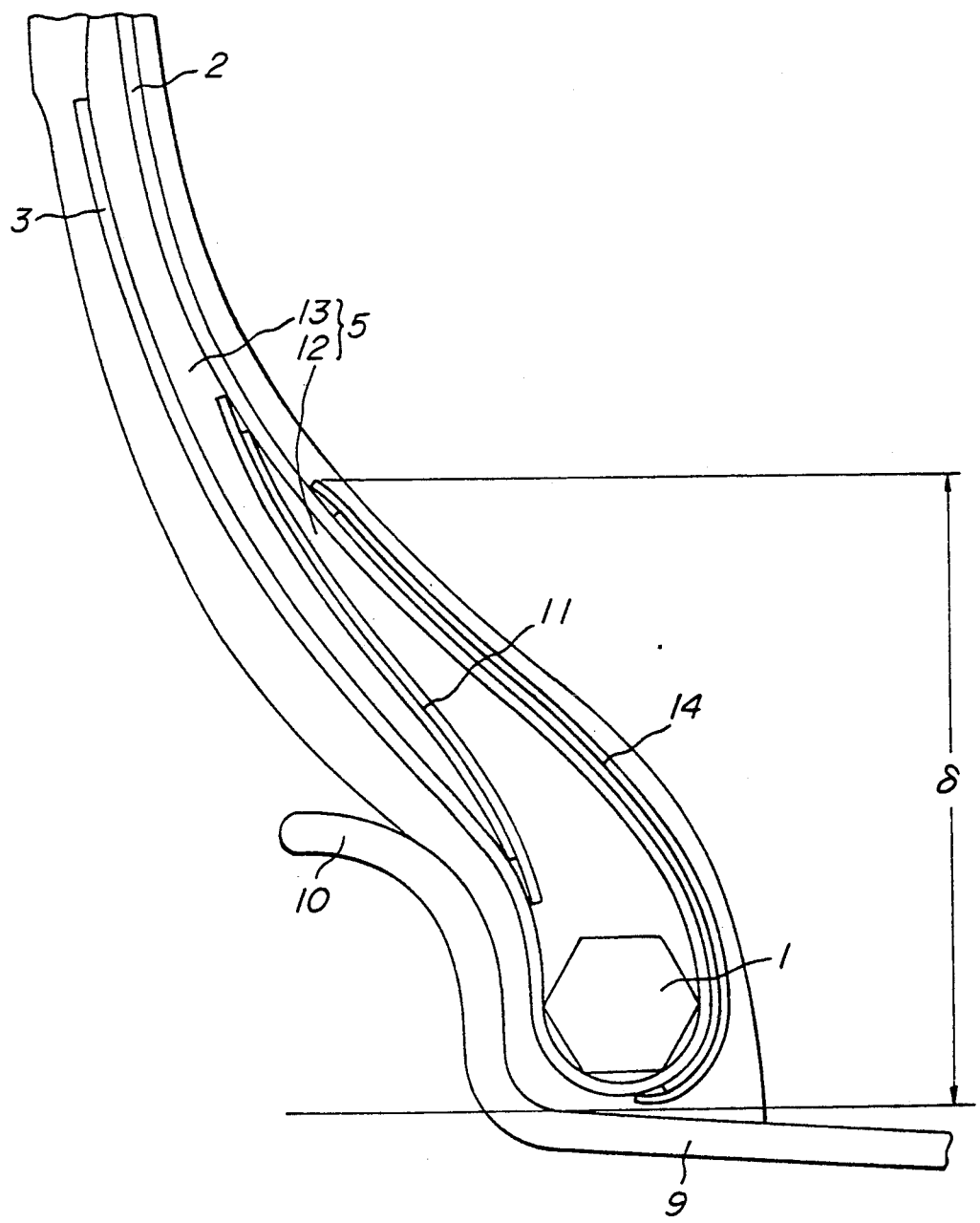
FIG_4

FIG_5
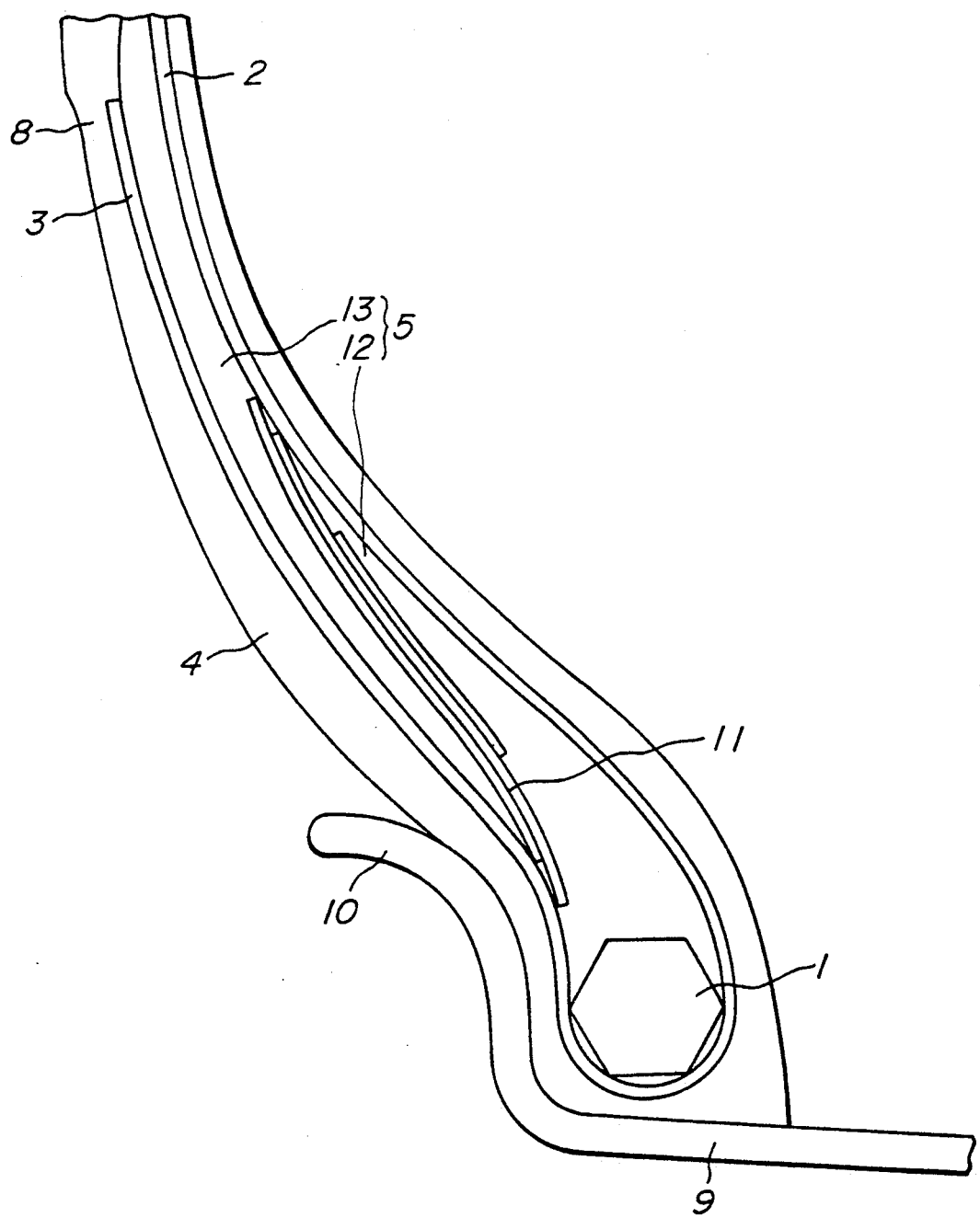

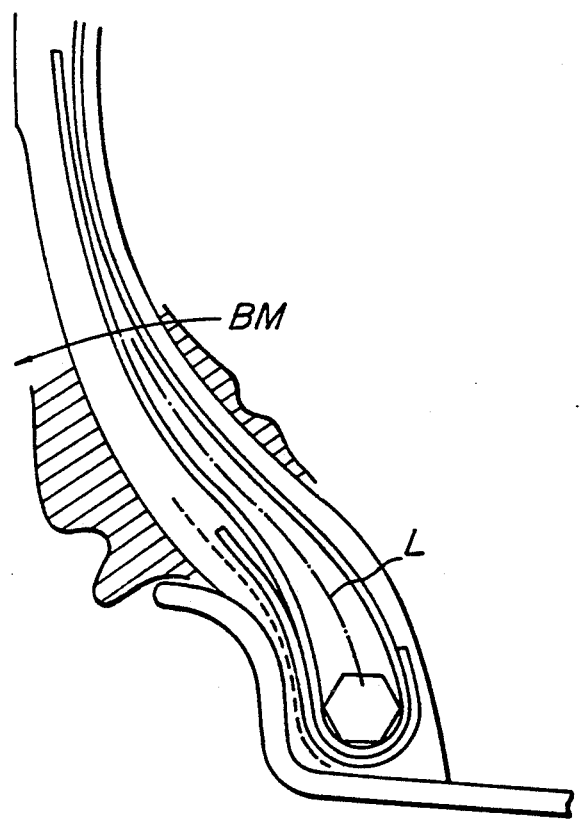
FIG_6
PRIOR ART

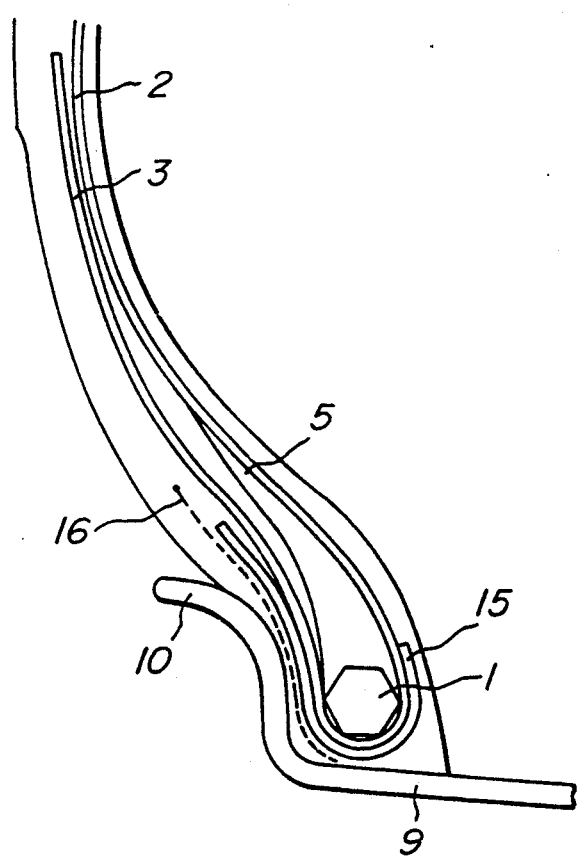
FIG_7
PRIOR ART

PNEUMATIC RADIAL TIRES FOR CONSTRUCTION VEHICLES

BACKGROUND OF THE INVENTION

1. Field of the Invention

This invention relates to pneumatic radial tires for construction vehicles, which are mounted on large size dump trucks used on large scale civil engineering sites and ore mining sites and used on a rough ground surface under severer conditions at a heavy load. More particularly it relates to an improvement in bead durability of such a tire.

2. Related Art Statement

When the pneumatic radial tire for construction vehicles is compared with pneumatic radial tires for truck and bus under the same heavy load, it is used under conditions that the speed range to be used is low and the load is high at the same tire size (under the same internal pressure) or the internal pressure is low (under the same load).

In the pneumatic radial tire for construction vehicles, the flexible amount ranging from the sidewall portion to the bead portion is large as compared with the other heavy duty tires and also the trouble in the bead portion is frequently caused due to the application of a large load during the running on considerably uneven rough roads, so that the improvement of the bead portion durability is unavoidable in order to enhance the reliability of the pneumatic radial tire for construction vehicles in use.

Heretofore, the tire of this type is provided with a carcass comprised of rubberized steel cord ply(s) toroidally extending between a pair of bead cores and turned around the bead core from inside of the tire toward outside thereof as a body reinforcement, and at least two chafers each comprised of rubberized nylon cord fabric or steel cord fabric, cords of which chafers being crossed with each other, and arranged along the carcass ply turnup as a bead portion reinforcement in the bead portion having a skeleton structure of bead core and carcass ply turnup region surrounding the bead core.

The use of the chafer enhances the rigidity of the bead portion, but when it is repeatedly subjected to compression deformation during running of the tire, which is particularly conspicuous in this type of the tire, the turnup portion of the carcass ply and the chafer portion frequently and easily cause the fatigue fracture and also the rigidity required in the bead portion can not sufficiently be ensured and there is a risk of developing from rubber cracking along the turnup portion of the carcass ply comprised of steel cords and at the end of the chafer toward the separation failure.

On the other hand, bending rigidity can particularly be enhanced by increasing the thickness of the stiffener rubber placed between the carcass ply and the turnup portion thereof on the bead core. But, when it is repeatedly subjected to compression deformation, there is a fear of breaking the turnup portion of the carcass ply and hence there is caused a separation failure near to the carcass ply.

SUMMARY OF THE INVENTION

It is, therefore, an object of the invention to provide pneumatic radial tires for construction vehicles capable of developing sufficient bead portion durability even in use under severe conditions subjected to repetitive compression deformation.

The inventors have noticed that the failures of the bead portion in the pneumatic radial tire for construction vehicles are frequently caused in sites having many curved courses such as mining sites or the like and analyzed external forces applied to the bead portion and have found that when large lateral force or distortion is applied to the tire, the bead portion failure is caused. Hence, the enhancement of shearing rigidity and distortion rigidity in the radial direction of the tire particularly brings about the improvement of the bead portion durability instead of the bending rigidity in the bead portion, and as a result the invention has been accomplished.

According to the invention, there is the provision of a pneumatic radial tire for construction vehicles comprising a radial carcass of rubberized steel cord ply toroidally extending between a pair of bead cores and wound around the bead core from inside of the tire toward outside to form a turnup portion, a stiffener rubber disposed on the bead core, and at least two reinforcing layers of rubberized fiber cord fabrics having different cord directions and embedded in the stiffener rubber as a bead portion reinforcement; said reinforcing layer satisfying the following relations:

$$\alpha = (0.5 - 0.87).H$$

$$\beta = (0.52 - 0.78).h$$

in which $\alpha$ is a height of an end of the reinforcing layer positioned in the vicinity of the inner surface of the turnup portion and inward in the radial direction of the tire and measured from base line of a normal rim, $\beta$ is a height of other end of the reinforcing layer positioned in the vicinity of the outer surface of the carcass ply and outward in the radial direction of the tire and measured from the base line, H is a flange height of the normal rim and h is a height at a position corresponding to maximum width of the carcass measured from the base line.

In a preferred embodiment of the invention, the stiffener rubber is comprised of a hard rubber layer extending closely along the outer surface of the carcass ply above the bead core and outward in the radial direction of the tire so as to gradually reduce the thickness thereof, and a soft rubber layer extending closely along the inner surface of the turnup portion and the outer surface of the carcass ply outward in the radial direction of the tire, and the reinforcing layer is arranged at the boundary between the hard rubber layer and the soft rubber layer. In another preferable embodiment of the invention, elastic moduli Ma and Mb at 100% elongation of the hard rubber layer and the soft rubber layer constituting the stiffener rubber and a elastic modulus Mc at 100% elongation of the rubber coating the reinforcing layer satisfy the following relations:

$$Ma > Mc > Mb$$

$$Ma - Mc > Mc - Mb$$

Moreover, the rubberized steel cord ply means that twisted bundles of so-called steel wires are arranged in parallel to each other and embedded in a coating rubber, and the rubberized fiber cord fabric means that the organic fiber cords such as nylon, polyester, polyamide or the like are embedded in a coating rubber.

BRIEF DESCRIPTION OF THE DRAWINGS

The invention will be described with reference to the accompanying drawings, wherein:

FIG. 1 is a sectional view of the tire according to the invention;

FIGS. 2 to 5 are schematically explanatory views of main parts in various embodiments of the tire according to the invention;

FIG. 6 is a schematically explanatory view showing a strain distribution under loading in the conventional heavy duty pneumatic radial tire for construction vehicle; and FIG. 7 is a schematically explanatory view of a main part of the conventional bead portion reinforcement.

DESCRIPTION OF THE PREFERRED EMBODIMENTS

In FIG. 1 is sectionally shown a left half of a first embodiment of the pneumatic radial tire for a construction vehicle according to the invention, wherein numeral 1 is a bead core, numeral 2 a carcass ply, numeral 3 a turnup portion of the carcass ply 2, numeral 4 a bead portion, numeral 5 a stiffener rubber placed on the bead core 1, numeral 6 a belt, numeral 7 a tread rubber, numeral 8 a sidewall rubber, numeral 9 a normal rim and numeral 10 a flange of the rim 9.

The carcass ply 2 is formed by toroidally extending the above rubberized steel cords between a pair of bead cores 1 in the radial direction and wound around the bead core 1 from inside of the tire toward outside thereof to form a turnup portion 3.

The belt 6 is comprised of plural belt layers each containing rubberized steel cords and superimposed about a crown portion of the carcass ply 2 and embedded in the tread rubber 7 for reinforcing the tread portion according to the usual practice for this type of the tire.

In order to reinforce the bead portion 4, at least two reinforcing layers 11 of rubberized fiber cord fabrics having different cord directions are embedded in the stiffener rubber 5, which serves to support stress at tensile and compression regions when the bead portion 4 is subjected to bending deformation falling into the flange 10 of the normal rim 9 under loading.

In this case, it is desirable that the reinforcing layer 11 is not arranged along the outside of the carcass ply 2 and the inside of the turnup portion 3 in order to prevent the separation failure between the reinforcing layer 11 and the carcass ply 2 and/or the turnup portion 3 thereof due to the shearing strain. Therefore, the reinforcing layer 11 is arranged outward from the vicinity of the inner surface of the turnup portion 3 up to the vicinity of the outer surface of the carcass ply 2 in the radial direction of the tire to extend across the stiffener rubber.

That is, when the tire is mounted onto the normal rim and inflated under a normal internal pressure, the reinforcing layer 11 satisfies such conditions that a height $\alpha$ at an end of the reinforcing layer 11 near the inside of the turnup portion 3 as measured from a rim base line (straight line passing through a point separated from the rotational axis of the tire by $\frac{1}{2}$ of a diameter D of the normal rim 9 and in parallel to the rotational axis) is within a range of 0.5–0.87 times of the flange height H of the normal rim 9 and a height $\beta$ at the other end of the reinforcing layer 11 near to the outside of the carcass ply 2 as measured from the rim base line is within a range of 0.52–0.78 times of a height h in a position of maximum width of the carcass ply 2 measured from the rim base line.

The stiffener rubber 5 is a composite of a hard rubber layer 12 closely extending along the outer surface of the carcass ply 2 above the bead core 1 and located inside the turnup portion 3 and a soft rubber layer 13 superimposed about the hard rubber layer 12 and closely extending along the inner surface of the turnup portion 3 and the outer side of the carcass ply 2. The reinforcing layer 11 is interposed between the hard rubber layer 12 and the soft rubber layer 13, whereby the reinforcement for the bead portion is enhanced.

In this case, it is preferable that elastic moduli at 100% elongation Ma and Mb of the hard rubber layer 12 and the soft rubber layer 13 in the stiffener rubber 5 and elastic modulus at 100% elongation Mc of coating rubber in the reinforcing layer 11 have the following relations:

$$Ma > Mc > Mb$$

$$Ma - Mc > Mc - Mb$$

That is, good results are obtained when the Ma of the hard rubber layer 12 is 60–80 kgf/cm$^2$, Mb of the soft rubber layer 13 is 18–35 kgf/cm$^2$ and Mc of the coating rubber is 25–45 kgf/cm$^2$.

The cord directions of two rubberized fiber cord fabrics in the reinforcing layers 11 as shown in FIG. 1 are different from each other. In this case, the cord direction is preferable to be within a range of 30°–60° as an angle with respect to a tangent at a point of phantom circle intersecting with the flange height H, which is applied to the plural reinforcing layer 11 as mentioned later. Furthermore, it is desirable that the strength at break in total of the cords of the reinforcing layer 11 in the cord direction is not less than 200 kgf/cm. On the other hand, when the strength at break exceeds 1400 kgf/cm, the rigidity becomes too high to cause the separation failure. Therefore, the rubberized fiber cord fabric is selected to render the strength at break in total of the laminated rubberized fiber cord fabrics constituting the reinforcing layer 11 into the above range.

In FIG. 3 is shown another embodiment of a main part of the tire when using the reinforcing layer 11 of three cord fabrics. In any cases inclusive of FIG. 1, it is preferable that as shown in FIG. 2, a height $\gamma$ at an intersect between a thickness center of the reinforcing layer 11 and a position that the thicknesses a of the hard rubber layer 12 and the soft rubber layer 13 are equal to each other in a normal line of the carcass ply as measured from the rim base line is within a range of 0.38–0.47 times of the height h.

In FIG. 4 is shown a further embodiment for additionally improving the bending rigidity by arranging a chafer 14 having the same structure as in the reinforcing layer 11 along the inner surface of the carcass ply 2. In FIG. 5 is shown a modified embodiment of FIGS. 1 and 2, wherein an additional cord fabric is partially added in addition to the two cord fabrics as the reinforcing layer. In the latter case, it is important to arrange the additional cord fabric around the position of the above height $\gamma$.

In any case, the arrangement of the reinforcing layer 11 is extended according to the above conditions.

When the tire mounted onto each wheel of the construction vehicle is subjected to loading such as vehicle weight and carrying load, as shown in FIG. 6, the bead portion 4 closely adapted to the rim through the bead core is subjected to a deformation of enlarging in the widthwise direction of the tire at a region above the flange 10 of the rim 9 due to the above loading to create a bending moment BM in a direction of causing the fall-down along the upper surface of the flange 10, in which the bead portion 4 is divided into tensile region inside the tire and compression region at the outside thereof around a bending neutral axis L. As shown in FIG. 6, the distribution of compression strain produced at the outside of the tire is considerably large as compared with the distribution of tensile strain at the inside thereof in case of the conventional bead portion reinforcement, so that the improvement of durability is critical in the conventional bead portion reinforcement.

On the other hand, it is possible to absorb external force by thinning the sidewall rubber. However, such a means can not be adopted because there is a risk of causing cut failure in the sidewall portion, for example, by scattered rocks and stones under severe service conditions for this type of the tire. Also, the running stability of the vehicle is damaged. Moreover, it is possible to enhance the bending rigidity of each of the bead portion and the sidewall portion, but in this case the input force to the belt end in the tread portion of the tire is increased to facilitate the occurrence of separation failure.

According to the invention, the reinforcing layer 11 is arranged between the carcass ply 2 and the turnup portion 3 thereof without arranging the reinforcing member such as the chafer or the like outside the turnup portion 3, whereby the shearing rigidity and the distortion rigidity are particularly given to eliminate nucleus of separation failure and suppress the falling of the bead portion 4 to thereby reduce the strain in the whole of the bead portion 4.

In this case, the reinforcing layer 11 arranged between the carcass ply 2 and the turnup portion 3 thereof contributes to increase the shearing rigidity in the tensile region as shown in FIG. 6 and to increase the distortion rigidity in the compression region. Therefore, the reinforcing layer 11 is arranged to extend over both regions.

In addition to the arrangement of the reinforcing layer 11, according to the invention, the elastic moduli at 100% elongation of the hard rubber layer 12, rubber of the reinforcing layer 11 and the soft rubber layer 13 are gradually decreased in this order at the inside of the turnup portion 3 above the bead core 1. Whereby the elastic modulus becomes larger in a part of the bead portion 4 having a less strain and smaller in a part of the bead portion 4 having a larger strain to reduce the strain energy as a whole of the bead portion 4 because the strain energy is proportional to a product of elastic modulus and square of strain. Furthermore, rubber of the reinforcing layer 11 having a middle value of the elastic modulus at 100% elongation is arranged between the hard rubber layer 12 and the soft rubber layer 13, whereby the difference in the rigidity between the hard rubber layer 12 and the soft rubber layer 13 can be mitigated to prevent the occurrence of separation failure in the reinforcing layer 11.

According to the invention, it is important that the height $\alpha$ of one end of the reinforcing layer 11 near to the inside of the turnup portion 3 as measured from the rim base line is within a range of 0.5-0.87 times of the flange height H and the height $\beta$ of the other end of the reinforcing layer 11 near to the outside of the carcass ply 2 as measured from the rim base line is within a range of 0.52-0.78 times of the height h at a position corresponding to the maximum width of the carcass ply 2 as measured from the rim base line.

When the height $\alpha$ is less than 0.5 times of the flange height H, the reinforcing layer 11 interposed between the bead core and the turnup portion is rubbed to cause a fear of breakage. When it exceeds 0.87 times, the one end is positioned outside a breakaway point between the rim flange and the outer surface of the tire in the radial direction of the tire, at where the shearing strain is increased due to the outward falling deformation of the bead portion to cause a fear of rubber cracking.

When the height $\beta$ is less than 0.52 times of the height h, the shearing strain is increased at the other end of the reinforcing layer due to the outward falling deformation of the bead portion to cause a fear of rubber cracking, while when it exceeds 0.78 times, the cost increases and the effect of improving the rigidity is less.

The following example is given in illustration of the invention and is not intended as limitation thereof.

As a test tire, pneumatic tires for construction vehicles having a tire size of 18.00 R25 and containing the reinforcing layer 11 for bead portion reinforcement made from two or three cord fabrics as shown in FIGS. 1 to 4 were compared with the conventional tire having the same tire size as shown in FIG. 7.

In all of these test tires, the carcass ply 2 had a radial arrangement of steel cords having a tensile strength of 280 kgf/cord (end count: 22 cords/5 cm), and the belt 6 was comprised of four belt layers, first and second layers of which layers being comprised of steel cords having a tensile strength of 280 kgf/cord (end count: 26 cords/5 cm) and third and fourth layers being comprised of high-elongation steel cords having a tensile strength of 170 kgf/cord (end count: 16 cords/5 cm), in which cords of these layers were crossed with each other at a cord angle of 24° with respect to the equator of the tire.

On the other hand, the reinforcing layer 11 was comprised of two or three rubberized nylon fiber (1260 d/2) cord fabrics (end count: 35.4 cords/5 cm) having different cord directions and the chafer 14 was comprised of the same rubberized nylon fiber cord fabric. In the embodiments of FIGS. 1, 3 and 4, the cord direction had an angle of 35° with respect to the tangent at a point of phantom circle intersecting with the height H of the rim flange 10, and that in the embodiment of FIG. 2 was 45°. Moreover, the strength at break in total of the reinforcing layer 11 in the cord direction in the embodiments of FIGS. 1, 2 and 4 was about 295 kgf/cm, and that in the embodiment of FIG. 3 was about 442 kgf/cm.

In the reinforcing layer 11, the minimum height $\alpha$ was 0.7 times of the height H of the rim flange 10 (63.5 mm) in case of FIGS. 1, 2, and 4 and 0.62 times in case of FIG. 3, while the maximum height $\beta$ was 0.6 times of the height h at the maximum width of the carcass ply 2 (230 mm) in all embodiments. Furthermore, the height $\gamma$ as shown in FIG. 2 was 0.4 times of the height h (230 mm) in all embodiments.

Moreover, the height $\delta$ (FIG. 4) at the upper end of the chafer 14 arranged inside the carcass ply as measured from the rim base line was 0.57 times of the above height h.

The elastic moduli at 100% elongation of rubbers arranged inside the turnup portion 3 were 69 kgf/cm² in the hard rubber layer 12 of the stiffener 5, 24 kgf/cm² in the soft rubber layer 13 and 35 kgf/cm² in the coating rubber for the reinforcing layer 11.

In the conventional reinforcing structure of FIG. 7, the stiffener rubber 5 was the same as mentioned above, but the reinforcing layer 11 was not used. Furthermore, a wire chafer 15 was arranged around the bead core 1 from the inside of the tire toward the outside thereof so that the height of the inner end of the chafer measured from the rim base line was 0.79 times of the height H of the rim flange 10 and the height of the outer end was 0.39 times of the height h, and also a nylon chafer 16 was arranged along the turnup portion 3 so that the height of this chafer was about 0.5 times of the height h.

These test tires were subjected to a durability test of a step-load system under conditions where an internal pressure was 7 kgf/cm², a speed was 20 km/hr, a drum diameter was 5000 mm, and a load corresponding to 80% of a test load of 9.250 kg (100% load) was applied at the starting time and a 100% load was applied for 12 hours and then a load was increased every 10%.

When the running time until the occurrence of "bulging" due to rubber cracking produced in the bead portion near to the outer edge of the rim flange in the radial direction and the separation of the turnup portion was represented by an index on the basis that the conventionally typical bead portion reinforcement of FIG. 7 was 100, the index value was 120 in the embodiment of FIG. 1, 124 in the embodiment of FIG. 2, 131 in the embodiment of FIG. 3 and 136 in the embodiment of FIG. 4, respectively, from which it was confirmed that the remarkable enhancement of the bead portion durability was achieved in the invention.

Furthermore, a test specimen (composite laminate) having the same structure in the vicinity of the height $\gamma$ as in the above test tires was prepared every test tire, and then the deformed amount of the specimen when applying bending force, shearing force or distortion force was measured, from which the respective rigidity value (kgf/mm) was calculated. Moreover, the test specimen had a length of 120 mm and a width of 50 mm. The thus obtained results are shown in Table 1 on the basis that the conventional test specimen of FIG. 7 is 100.

TABLE 1

| Structure of test specimen | Bending rigidity | Shearing rigidity | Distortion rigidity |
|---|---|---|---|
| FIG. 7 | 100 | 100 | 100 |
| FIG. 1 | 139 | 492 | 367 |
| FIG. 3 | 141 | 516 | 375 |
| FIG. 4 | 161 | 650 | 495 |

As mentioned above, according to the invention, the bead portion durability of the pneumatic radial tire for construction vehicles particularly required for satisfying a demand of transportation productivity can be improved under severer service conditions that the carrying load is increased with the large sizing of the construction vehicle and the tire is used on rough ground having many curved courses.

What is claimed is:

1. A pneumatic radial tire for construction vehicles comprising; a radial carcass of rubberized steel cord ply toroidally extending between a pair of bead cores and wound around the bead core from inside of the tire toward outside to form a turnup portion, a stiffener rubber disposed on the bead core, and at least two reinforcing layers of rubberized fiber cord fabrics having different cord directions and embedded in the stiffener rubber as a bead portion reinforcement so that said reinforcing layers do not extend along an outer surface of the carcass ply and the surface of said turnup portions; said reinforcing layer satisfying the following relations:

$$\alpha = (0.5 - 0.87) \cdot H$$

$$\beta = (0.52 - 0.78) \cdot h$$

where: $\alpha$ is a height of an end of the reinforcing layer positioned in the vicinity of the inner surface of the turnup portion and inward in the radial direction of the tire and measured from base line of a normal rim, $\beta$ is a height of other end of the reinforcing layer positioned in the vicinity of the outer surface of the carcass ply and outward in the radial direction of the carcass ply and outward in the radial direction of the tire and measured from the base line, H is a flange height of the normal rim and h is a height at a position corresponding to maximum width of the carcass measured from the base line, wherein said stiffener rubber is comprised of a hard rubber layer extending closely along the outer surface of the carcass ply above the bead core and outward in the radial direction of the tire to gradually reduce the thickness thereof, and a soft rubber layer extending closely along the inner surface of the turnup portion and the outer surface of the carcass ply outward in the radial direction of the tire, and the reinforcing layer is arranged at the boundary between the hard rubber layer and the soft rubber layer.

2. The pneumatic radial tire according to claim 1, wherein elastic moduli Ma and Mb at 100% elongation of the hard rubber layer and the soft rubber layer constituting the stiffener rubber and a elastic modulus Mc at 100% elongation of the rubber coating the reinforcing layer satisfy the following relations:

Ma > Mc > Mb

Ma − Mc > Mc − Mb.

3. The pneumatic radial tire according to claim 1, wherein the cord directions for said reinforcing layers are in the range of 30°–60° with respect to a tangent at a point where a phantom circle intersects at height H.

4. The pneumatic radial tire according to claim 1, wherein said rubberized fiber cord fabrics of said reinforcing layers have a strength at breakage in the range of 200 kgf/cm–1400 kgf/cm.

5. The pneumatic radial tire according to claim 1, wherein a center of thickness of said reinforcing layers is a point on a line normal to said carcass ply at a position where the thickness of said hard rubber layer and said soft rubber layer are equal to each other and at a distance in the range of 0.38–0.47 h.

6. The pneumatic radial tire according to claim 1 further comprising a chamber layer positioned on the axially inner surface of said carcass ply.

7. The pneumatic radial tire according to claim 1, wherein said reinforcing layers comprise three layers.

* * * * *